US012489223B2

(12) United States Patent
Huang

(10) Patent No.: US 12,489,223 B2
(45) Date of Patent: Dec. 2, 2025

(54) ELECTRONIC DEVICE

(71) Applicant: Advanced Semiconductor Engineering, Inc., Kaohsiung (TW)

(72) Inventor: Hong-Sheng Huang, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 246 days.

(21) Appl. No.: 18/112,991

(22) Filed: Feb. 22, 2023

(65) Prior Publication Data

US 2024/0283165 A1 Aug. 22, 2024

(51) Int. Cl.
*H01Q 21/06* (2006.01)
*H01Q 1/24* (2006.01)
*H01Q 21/00* (2006.01)

(52) U.S. Cl.
CPC ........... *H01Q 21/065* (2013.01); *H01Q 1/243* (2013.01); *H01Q 21/0006* (2013.01)

(58) Field of Classification Search
CPC ........ H01Q 1/2283; H01Q 1/24; H01Q 1/242; H01Q 1/243; H01Q 1/48; H01Q 1/50; H01Q 1/52; H01Q 5/385; H01Q 9/0414; H01Q 19/005; H01Q 21/0006; H01Q 21/065; H01Q 21/08; H01Q 21/24
See application file for complete search history.

(56) References Cited

U.S. PATENT DOCUMENTS 9,806,422 B2 10/2017 Garcia et al.
11,296,415 B2 * 4/2022 Fabrega Sanchez ........................ H01Q 21/065
2009/0322642 A1 * 12/2009 Foo ...................... H01Q 19/005 343/843

FOREIGN PATENT DOCUMENTS

CN 215600567 U * 1/2022 ............... H01Q 9/04
TW 201032390 A1 * 9/2010 ............... H01Q 1/38

* cited by examiner

*Primary Examiner* — Hoang V Nguyen
(74) *Attorney, Agent, or Firm* — FOLEY & LARDNER LLP

(57) ABSTRACT

An electronic device is provided. The electronic device includes a carrier, an antenna element, a first parasitic patch, and a first current distribution unit. The antenna element is at least partially over the carrier. The first parasitic patch is adjacent to the antenna element. The first current distribution unit is configured to form a first equivalent patch area of the first parasitic patch. The first equivalent patch area has a first length extending in a direction substantially parallel to a first direction of electric current of the antenna element and substantially equal to λ/2, and λ is a wavelength of an operating frequency of the antenna element.

19 Claims, 15 Drawing Sheets

ELECTRONIC DEVICE

BACKGROUND

1. Technical Field

The present disclosure relates generally to an electronic device.

2. Description of the Related Art

Wireless communication devices, such as cell phones, typically include antennas for transmitting and receiving radio frequency (RF) signals. In recent years, with the continuous development of mobile communication and the pressing demand for high data rate and stable communication quality, relatively high frequency wireless transmission (e.g., 28 GHz or 60 GHz) has become one of the most important topics in the mobile communication industry. In order to achieve such relatively high frequency wireless transmission, various designs of antennas have been developed. However, it is difficult to reduce the size of the wireless communication device to attain a suitably compact product design while still achieving a satisfactory RF signal transmission.

SUMMARY

In one or more embodiments, an electronic device includes a carrier, an antenna element, a first parasitic patch, and a first current distribution unit. The antenna element is at least partially over the carrier. The first parasitic patch is adjacent to the antenna element. The first current distribution unit is configured to form a first equivalent patch area of the first parasitic patch. The first equivalent patch area has a first length extending in a direction substantially parallel to a first direction of electric current of the antenna element and substantially equal to $\lambda/2$, and $\lambda$ is a wavelength of an operating frequency of the antenna element.

In one or more embodiments, an electronic device includes a carrier and an antenna. The antenna includes a first patch, a parasitic patch, and a conductive element. The first patch is disposed over the carrier. The parasitic patch is adjacent to the first patch and configured to electrically couple with the first patch to increase a bandwidth of the antenna. The conductive element is configured to provide a ground connection for the parasitic patch.

In one or more embodiments, an electronic device includes a carrier, an antenna element, and a first grounded parasitic patch. The antenna element is at least partially over the carrier. The antenna element includes a first feed 21 configured to transmit a first RF signal and a second feed 22 configured to transmit a second RF signal. A linear polarization of the first RF signal is orthogonal to a linear polarization of the second RF signal. The first grounded parasitic patch is coupled to the antenna element.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1A:
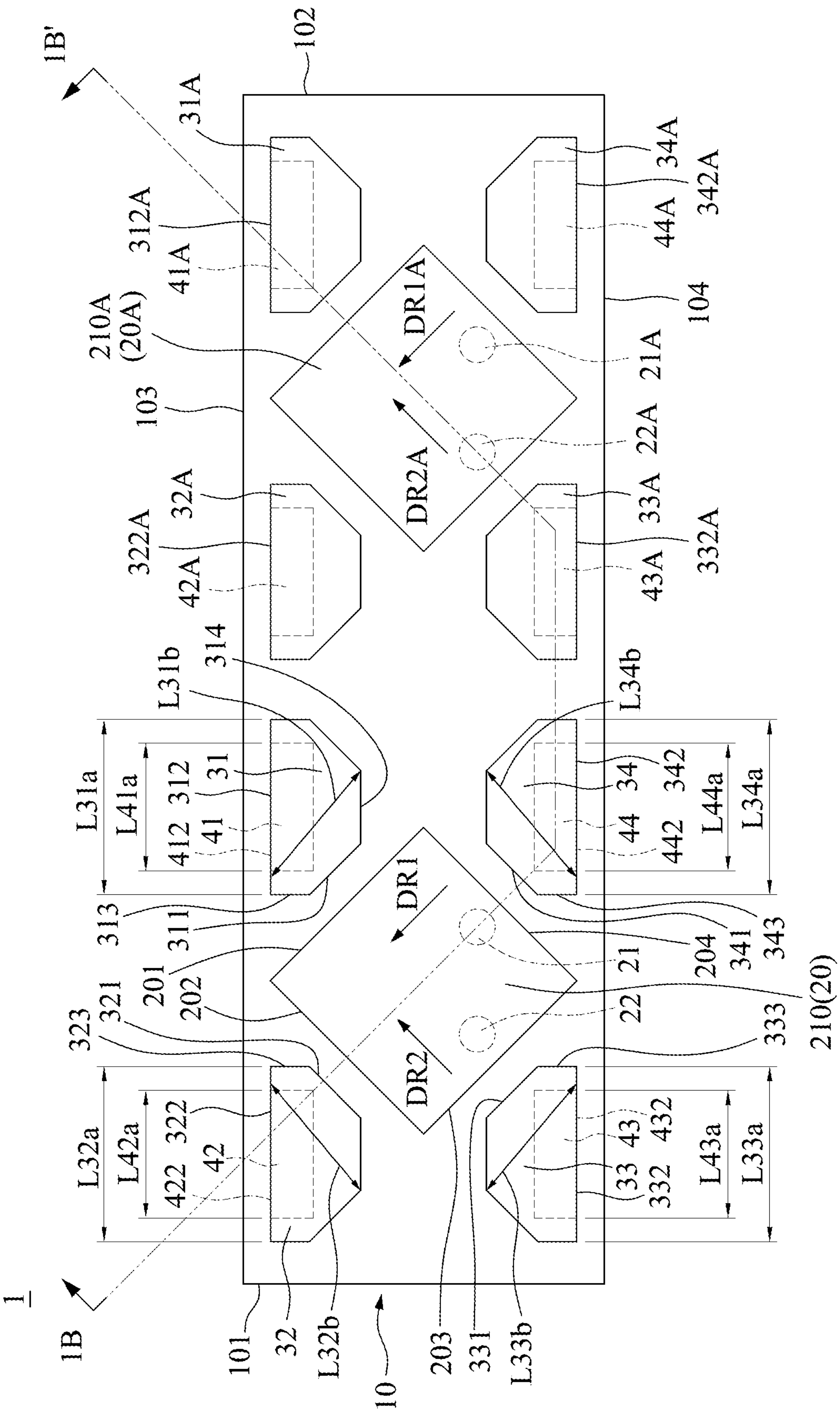
FIG. 1A is a top view of an electronic device in accordance with some embodiments of the present disclosure.

FIG. 1A is a top view of an electronic device 1 in accordance with some embodiments of the present disclosure. The electronic device 1 may include a carrier 10, one or more antenna elements 20 and 20A, one or more parasitic patches 31-34 and 31A-34A, and one or more conductive elements 41-44 and 41A-44A.

The carrier 10 may include, for example, a printed circuit board, such as a paper-based copper foil laminate, a composite copper foil laminate, or a polymer-impregnated glass-fiber-based copper foil laminate. The carrier 10 may include an interconnection structure, such as a redistribution layer (RDL) and a grounding element. In some embodiments, the carrier 10 may include a multi-layer substrate which includes a core layer and one or more conductive materials and/or structures disposed on an upper surface and a bottom surface of the carrier 10. The conductive materials and/or structures may include a plurality of conductive traces and a plurality of conductive vias. In some embodiments, the carrier 10 has sides (also referred to as "lateral surfaces") 101, 102, 103, and 104. In some embodiments, the side 101 is opposite to the side 102, and the side 103 is opposite to the side 104.

The antenna element 20 may be at least partially over the carrier 10. In some embodiments, the antenna element 20 includes a patch 210 (also referred to as "a stack patch") and feeds 21 and 22. In some embodiments, the patch 210 is disposed over the carrier 10. In some embodiments, the antenna element 20 (or the patch 210) has a plurality of edges or sides (e.g., edges 201, 202, 203, and 204) from a top view perspective. In some embodiments, the feed 21 and the feed 22 are configured to transmit RF signals having linear polarizations orthogonal to each other. For example, the feed 2A is configured to transmit an RF signal (also referred to as "a first RF signal"), the feed 22 is configured to transmit another RF signal (also referred to as "a second RF signal"), and a linear polarization of the first RF signal is orthogonal to a linear polarization of the second RF signal. In some embodiments, the antenna element 20 is or includes a dual-polarized antenna element. In some embodiments, the antenna element 20 has an operating frequency with a wavelength 2.

In some embodiments, an electric current flows through the feed 21 in a direction DR1, and an electrical current flows through the feed 22 in a direction DR2. In some embodiments, the direction DR1 of electric current flowing through the feed 21 is perpendicular to the direction DR2 of electric current flowing through the feed 22. In some embodiments, the feeds 21 and 22 penetrate the carrier 10 to electrically connect to a driven patch of the antenna element 20.

The antenna element 20A may be at least partially over the carrier 10. In some embodiments, the antenna element 20A includes a patch 210A (also referred to as "a stack patch") and feeds 21A and 22A. In some embodiments, the patch 210A is disposed over the carrier 10. In some embodiments, the feed 21A and the feed 22A are configured to transmit RF signals having linear polarizations orthogonal to each other. For example, the feed 21A is configured to transmit an RF signal, the feed 22A is configured to transmit another RF signal, and a linear polarization of the RF signal transmitted by the feed 21A is orthogonal to a linear polarization of the RF signal transmitted by the feed 22A. In some embodiments, the antenna element 20A is or includes a dual-polarized antenna element. In some embodiments, the antenna element 20A has an operating frequency with a wavelength λ'. In some embodiments, the antenna elements 20 and 20A have substantially the same operating frequency or different operating frequencies depending on the actual applications of the electronic device 1.

In some embodiments, an electric current flows through the feed 21A in the direction DR1A, and an electrical current flows through the feed 22A in the direction DR2A. In some embodiments, the feeds 21A and 22A penetrate the carrier 10 to electrically connect to a driven patch of the antenna element 20A. The direction DR1A may be substantially parallel to the direction DR1, and the direction DR2A may be substantially parallel to the direction DR2.

In some embodiments, the antenna element 20 has a first side (e.g., the edge 201) and a second side (e.g., the edge 203) opposite to the first side, the parasitic patch 31 is disposed at the first side, and the parasitic patch 33 is disposed at the second side. In some embodiments, the antenna element 20 further has a third side (e.g., the edge 202) and a fourth side (e.g., the edge 204) opposite to the third side, the parasitic patch 32 is disposed at the third side, and the parasitic patch 34 is disposed at the fourth side.

The parasitic patch 31 may be adjacent to the antenna element 20. In some embodiments, the parasitic patch 31 is or includes a grounded parasitic patch. In some embodiments, the parasitic patch 31 is coupled to the antenna element 20. In some embodiments, the patch 31 has one or more lengths (e.g., lengths L31*a* and L31*b*) substantially equal to or less than λ/2. In some embodiments, the length L31*b* is substantially parallel to the direction DR1 of electric current flowing through the feed 21. In some embodiments, the parasitic patch 31 has an asymmetric shape from a top view perspective. In some embodiments, the parasitic patch 31 has a plurality of edges (e.g., edges 311, 312, and 313) from a top view perspective. In some embodiments, the edge 311 of the parasitic patch 31 is adjacent to the edge 201 of the antenna element 20 from a top view perspective. In some embodiments, the edge 311 of the parasitic patch 31 is substantially parallel to the edge 201 of the antenna element 20. In some embodiments, a length of the edge 311 of the parasitic patch 31 is less than about λ/2. In some embodiments, a length of the edge 311 of the parasitic patch 31 is less than a length of the edge 201 of the antenna element 20. In some embodiments, the edge 312 has a maximum length among the edges of the parasitic patch 31. In some embodiments, the conductive element 41 is disposed closer to the edge 312 than to the other edges of the parasitic patch 31. In some embodiments, a length (e.g., the length L31*a*) of the edge 312 of the parasitic patch 31 is substantially equal to or less than λ/2. In some embodiments, a length (e.g., the length L31*a*) of the edge 312 of the parasitic patch 31 is substantially equal to λ/2. In some embodiments, the edge 312 of the parasitic patch 31 is substantially parallel to the side 103 of the carrier 10.

The parasitic patch 32 may be adjacent to the antenna element 20. In some embodiments, the parasitic patch 32 is or includes a grounded parasitic patch. In some embodiments, the parasitic patch 32 is coupled to the antenna element 20. In some embodiments, the patch 32 has one or more lengths (e.g., lengths L32*a* and L32*b*) substantially equal to or less than λ/2. In some embodiments, the length L32*b* is substantially parallel to the direction DR2 of electric current flowing through the feed 22. In some embodiments, the parasitic patch 32 has an asymmetric shape from a top view perspective. In some embodiments, the parasitic patch 31 and the parasitic patch 32 are mirror-image symmetric. In some embodiments, the parasitic patch 31 and the parasitic patch 32 collectively form a symmetric shape.

In some embodiments, the parasitic patch 32 has a plurality of edges (e.g., edges 321, 322, and 323) from a top view perspective. In some embodiments, the edge 321 of the parasitic patch 32 is adjacent to the edge 202 of the antenna element 20 from a top view perspective. In some embodiments, the edge 321 of the parasitic patch 32 is substantially parallel to the edge 202 of the antenna element 20. In some embodiments, a length of the edge 321 of the parasitic patch 32 is less than λ/2. In some embodiments, a length of the edge 321 of the parasitic patch 32 is less than a length of the edge 202 of the antenna element 20. In some embodiments, the edge 322 has a maximum length among the edges of the parasitic patch 32. In some embodiments, the conductive element 42 is disposed closer to the edge 322 than to the other edges of the parasitic patch 32. In some embodiments, a length (e.g., the length L32*a*) of the edge 322 of the parasitic patch 32 is substantially equal to or less than λ/2. In some embodiments, a length (e.g., the length L32*a*) of the edge 322 of the parasitic patch 32 is substantially equal to λ/2. In some embodiments, the edge 322 of the parasitic patch 32 is substantially parallel to the side 103 of the carrier 10.

The parasitic patch 33 may be adjacent to the antenna element 20. In some embodiments, the parasitic patch 33 is or includes a grounded parasitic patch. In some embodiments, the parasitic patch 33 is coupled to the antenna element 20. In some embodiments, the patch 33 has one or more lengths (e.g., lengths L33*a* and L33*b*) substantially equal to or less than λ/2. In some embodiments, the length L33*b* is substantially parallel to the direction DR1 of electric current flowing through the feed 21. In some embodiments, the parasitic patch 33 has an asymmetric shape from a top view perspective. In some embodiments, the parasitic patch 31 and the parasitic patch 33 are mirror-image symmetric. In some embodiments, the parasitic patch 31 and the parasitic patch 33 collectively form a symmetric shape. In some embodiments, the feed 21 is coupled to the parasitic patches 31 and 33 (or the grounded parasitic patches). In some embodiments, electrical current directions of the parasitic patches 31 and 33 are substantially parallel to the direction DR1 of electric current flowing through the feed 21. In some embodiments, the parasitic patch 31 and the parasitic patch 33 form an asymmetric shape with the direction DR1 of electric current flowing through the feed 21 as a symmetry axis.

In some embodiments, the parasitic patch 33 has a plurality of edges (e.g., edges 331, 332, and 333) from a top view perspective. In some embodiments, the edge 331 of the parasitic patch 33 is adjacent to the edge 203 of the antenna element 20 from a top view perspective. In some embodiments, the edge 331 of the parasitic patch 33 is substantially parallel to the edge 203 of the antenna element 20. In some embodiments, a length of the edge 331 of the parasitic patch 33 is less than λ/2. In some embodiments, a length of the edge 331 of the parasitic patch 33 is less than a length of the edge 203 of the antenna element 20. In some embodiments, the edge 332 has a maximum length among the edges of the parasitic patch 33. In some embodiments, the conductive element 43 is disposed closer to the edge 332 than to the other edges of the parasitic patch 33. In some embodiments, a length (e.g., the length L33*a*) of the edge 332 of the parasitic patch 33 is substantially equal to or less than λ/2. In some embodiments, a length (e.g., the length L33*a*) of the edge 332 of the parasitic patch 33 is substantially equal to λ/2. In some embodiments, the edge 332 of the parasitic patch 33 is substantially parallel to the side 104 of the carrier 10.

The parasitic patch 34 may be adjacent to the antenna element 20. In some embodiments, the parasitic patch 34 is or includes a grounded parasitic patch. In some embodiments, the parasitic patch 34 is coupled to the antenna element 20. In some embodiments, the patch 34 has one or more lengths (e.g., lengths L34*a* and L34*b*) substantially equal to or less than λ/2. In some embodiments, the length L34*b* is substantially parallel to the direction DR2 of electric current flowing through the feed 22. In some embodiments, the parasitic patch 34 has an asymmetric shape from a top view perspective. In some embodiments, the parasitic patch 32 and the parasitic patch 34 are mirror-image symmetric. In some embodiments, the parasitic patch 32 and the parasitic patch 34 collectively form a symmetric shape. In some embodiments, the feed 22 is coupled to the parasitic patches 32 and 34 (or the grounded parasitic patches). In some embodiments, electrical current directions of the parasitic patches 32 and 34 are substantially parallel to the direction DR2 of electric current flowing through the feed 22. In some embodiments, the parasitic patch 32 and the parasitic patch 34 form an asymmetric shape with the direction DR2 of electric current flowing through the feed 22 as a symmetry axis.

In some embodiments, the parasitic patch 34 has a plurality of edges (e.g., edges 341, 342, and 343) from a top view perspective. In some embodiments, the edge 341 of the parasitic patch 34 is adjacent to the edge 204 of the antenna element 20 from a top view perspective. In some embodiments, the edge 341 of the parasitic patch 34 is substantially parallel to the edge 204 of the antenna element 20. In some embodiments, a length of the edge 341 of the parasitic patch 34 is less than λ/2. In some embodiments, a length of the edge 341 of the parasitic patch 34 is less than a length of the edge 204 of the antenna element 20. In some embodiments, the edge 342 has a maximum length among the edges of the parasitic patch 34. In some embodiments, the conductive element 44 is disposed closer to the edge 342 than to the other edges of the parasitic patch 34. In some embodiments, a length (e.g., the length L34*a*) of the edge 342 of the parasitic patch 34 is substantially equal to or less than λ/2. In some embodiments, a length (e.g., the length L34*a*) of the edge 342 of the parasitic patch 34 is substantially equal to λ/2. In some embodiments, the edge 342 of the parasitic patch 34 is substantially parallel to the side 104 of the carrier 10.

In some embodiments, the structural and functional designs of the antenna element 20A and the parasitic patches 31A, 32A, 33A, and 34A (or the grounded parasitic patches) are the same as or similar to those of the antenna element 20 and the parasitic patches 31, 32, 33, and 34 (or the grounded parasitic patches), and the description thereof is omitted hereinafter.

The electronic device 1 may include an antenna including at least one of the antenna elements 20 and 20A and one or more of the parasitic patches 31, 32, 33, 34, 31A, 32A, 33A, and 34A. In some embodiments, the antenna includes the antenna element 20, the antenna element 20A, the patches 31, 32, 33, and 34 (or the grounded parasitic patches) coupled to the antenna element 20, and the patches 31A, 32A, 33A, and 34A (or the grounded parasitic patches) coupled to the antenna element 20A. In some embodiments, at least one of the patches 31, 32, 33, and 34 (or the grounded parasitic patches) is adjacent to the antenna element 20 (or the patch 210) and configured electrically couple with the patch 210 to increase a bandwidth of the antenna. In some embodiments, at least one of the patches 31A, 32A, 33A, and 34A (or the grounded parasitic patches) is adjacent to the antenna element 20A (or the patch 210A) and configured to increase a bandwidth of the antenna. In some embodiments, two or more of the parasitic patches 31, 32, 33, and 34 are adjacent to the antenna element 20 (or the patch 210) and collectively configured to increase the bandwidth of the antenna. In some embodiments, two or more of the parasitic patches 31A, 32A, 33A, and 34A are adjacent to the antenna element 20A (or the patch 210A) and collectively configured to increase the bandwidth of the antenna.

In some embodiments, the feed 21 and the feed 22 are configured to couple the antenna element 20 with two or more parasitic patches (e.g., the parasitic patches 31, 32, 33, and 34) to resonate at two different frequencies (e.g., a first frequency and a second frequency different from the first frequency). In some embodiments, the above two different frequencies are configured to determine a bandwidth of the antenna element 20. In some embodiments, the antenna element 20 is configured to couple with the parasitic patch 31 to resonate at a frequency (also referred to as "a first frequency"), and the antenna element 20 is configured to couple with the parasitic patch 33 to resonate at a different frequency (also referred to as "a second frequency" which is different from the first frequency). In some embodiments, the feed 21 and the feed 22 are configured to couple the antenna element 20 with two or more parasitic patches (e.g., the parasitic patches 31, 32, 33, and 34) to increase the bandwidth of the antenna. In some embodiments, the feed 21A and the feed 22A are configured to couple the antenna element 20A with two or more parasitic patches (e.g., the parasitic patches 31A, 32A, 33A, and 34A) to resonate at two different frequencies (e.g., a third frequency and a fourth frequency different from the third frequency, the third frequency being the same as or different from the first frequency, and the fourth frequency being the same as or different from the second frequency). In some embodiments, the feed 21A and the feed 22A are configured to couple the antenna element 20A with two or more parasitic patches (e.g., the parasitic patches 31A, 32A, 33A, and 34A) to increase the bandwidth of the antenna.

The conductive element 41 may be configured to provide a ground connection for the parasitic patch 31. In some embodiments, a length L41*a* of the conductive element 41 is substantially equal to or less than λ/2 from a top view perspective. In some embodiments, the length 41*a* of the conductive element 41 extends in a direction parallel to the side 103 of the carrier 10 from a top view perspective. In some embodiments, the conductive element 41 is disposed adjacent to the side 103 of the carrier 10. In some embodiments, the conductive element 41 is disposed close to the edge 312 of the parasitic patch 31 than to the other edges (e.g., the edges 311 and 313) of the parasitic patch 31. In some embodiments, the conductive element 41 has an edge (also referred to as "a long side") 412 having a maximum length among all of the edges of the conductive element 41 from a top view perspective. In some embodiments, the edge 412 of the conductive element 41 substantially aligns with the edge 312 of the parasitic patch 31. In some embodiments, the edge 412 extends in a direction substantially parallel to the side 103 of the carrier 10 from a top view perspective.

The conductive element 42 may be configured to provide a ground connection for the parasitic patch 42. In some embodiments, a length L42*a* of the conductive element 42 is substantially equal to or less than λ/2 from a top view perspective. In some embodiments, the length 42*a* of the conductive element 42 extends in a direction parallel to the side 103 of the carrier 10 from a top view perspective. In some embodiments, the conductive element 42 is disposed adjacent to the side 103 of the carrier 10. In some embodiments, the conductive element 42 is disposed close to the edge 322 of the parasitic patch 32 than to the other edges (e.g., the edges 321 and 323) of the parasitic patch 32. In some embodiments, the conductive element 42 has an edge 422 (also referred to as "a long side") having a maximum length among all of the edges of the conductive element 42 from a top view perspective. In some embodiments, the edge 422 of the conductive element 42 substantially aligns with the edge 322 of the parasitic patch 32. In some embodiments, the edge 422 extends in a direction substantially parallel to the side 103 of the carrier 10 from a top view perspective.

The conductive element 43 may be configured to provide a ground connection for the parasitic patch 43. In some embodiments, a length L43*a* of the conductive element 43 is substantially equal to or less than λ/2 from a top view perspective. In some embodiments, the length 43*a* of the conductive element 43 extends in a direction parallel to the side 104 of the carrier 10 from a top view perspective. In some embodiments, the conductive element 43 is disposed adjacent to the side 104 of the carrier 10. In some embodiments, the conductive element 43 is disposed close to the edge 332 of the parasitic patch 33 than to the other edges (e.g., the edges 331 and 333) of the parasitic patch 33. In some embodiments, the conductive element 43 has an edge 432 (also referred to as "a long side") having a maximum length among all of the edges of the conductive element 43 from a top view perspective. In some embodiments, the edge 432 of the conductive element 43 substantially aligns with the edge 332 of the parasitic patch 323. In some embodiments, the edge 432 extends in a direction substantially parallel to the side 104 of the carrier 10 from a top view perspective.

The conductive element 44 may be configured to provide a ground connection for the parasitic patch 44. In some embodiments, a length L44*a* of the conductive element 44 is substantially equal to or less than λ/2 from a top view perspective. In some embodiments, the length 44*a* of the conductive element 44 extends in a direction parallel to the side 104 of the carrier 10 from a top view perspective. In some embodiments, the conductive element 44 is disposed adjacent to the side 104 of the carrier 10. In some embodiments, the conductive element 44 is disposed close to the edge 342 of the parasitic patch 34 than to the other edges (e.g., the edges 341 and 343) of the parasitic patch 34. In some embodiments, the conductive element 44 has an edge 442 (also referred to as "a long side") having a maximum length among all of the edges of the conductive element 44 from a top view perspective. In some embodiments, the edge 442 of the conductive element 44 substantially aligns with the edge 342 of the parasitic patch 34. In some embodiments, the edge 442 extends in a direction substantially parallel to the side 104 of the carrier 10 from a top view perspective.

In some embodiments, the structural and functional designs of the conductive elements 41A, 42A, 43A, and 44A are the same as or similar to those of the conductive elements 41, 42, 43, and 44, and the description thereof is omitted hereinafter.

Figure 1B:
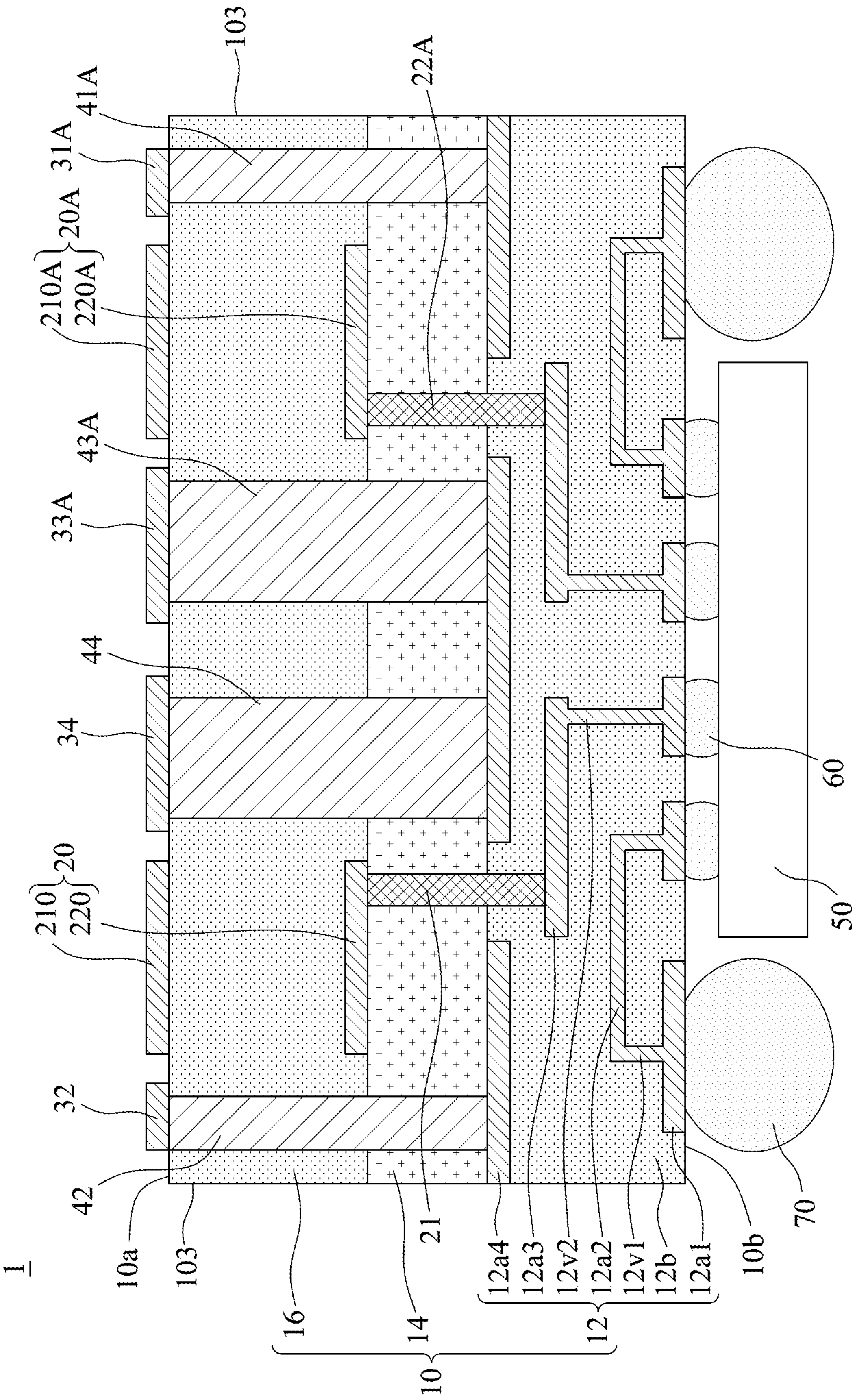
FIG. 1B is a cross-section of an electronic device in accordance with some embodiments of the present disclosure.

FIG. 1B is a cross-section of an electronic device 1 in accordance with some embodiments of the present disclosure. In some embodiments, FIG. 1B is a cross-section along a line 1B-1B' in FIG. 1A. The electronic device 1 may include a carrier 10, one or more antenna elements 20 and 20A, one or more parasitic patches (e.g., parasitic patches 31A, 32, 33A, and 34), one or more conductive elements (e.g., conductive elements 41A, 42, 43A, and 44), an electronic component 50, connection elements 60, and electrical contacts 70.

In some embodiments, the carrier 10 includes a RDL 12 and layers 14 and 16. In some embodiments, the layer 14 is stacked over the RDL 12, and the layer 16 is stacked over the layer 16. The layers 14 and 16 may be formed of or include different materials. The carrier 10 may have a surface 10*a* (also referred to as "a top surface") and a surface 10*b* (also referred to as "a bottom surface") opposite to the surface 10*a*. The surface 10*a* may be a top surface of the layer 16, and the surface 10*b* may be a bottom surface of the RDL 12.

In some embodiments, the RDL 12 includes conductive layers (also referred to as "wiring layers") 12*a*1, 12*a*2, 12*a*3, and 12*a*4, a dielectric layer 12*b*, and conductive vias 12*v*1 and 12*v*2. In some embodiments, the conductive layer 12*a*1 is electrically connected to the conductive layer 12*a*2 through the conductive vias 12*v*1. In some embodiments, the conductive layer 12*a*1 is electrically connected to the conductive layer 12*a*3 through the conductive vias 12*v*2. In some embodiments, the conductive layer 12*a*4 is or includes a ground element. In some embodiments, the conductive layer 12*a*4 is a ground plane or connected to ground. In some embodiments, the conductive layers 12*a*1, 12*a*2, 12*a*3, and 12*a*4 and the conductive vias 12*v*1 and 12*v*2 are encapsulated or covered by the dielectric layer 12*b*. The conductive layers 12*a*1, 12*a*2, 12*a*3, and 12*a*4 may be or may include Au, Ag, Al, Cu, or an alloy thereof. The dielectric layer 12*b* may include one or more organic dielectric layers, such as one or more BT laminates and/or one or more ABF laminates, and the BT laminate and/or the ABF laminate may include glass fibers.

In some embodiments, the layer 14 is or includes a dielectric layer. The layer 14 may be a core layer of the multi-layered structure of the carrier 10. In some embodiments, the layer 16 is or includes a dielectric layer. The layer 16 may include an organic dielectric layer, such as a BT laminate and/or an ABF laminate, and the BT laminate and/or the ABF laminate may include glass fibers. The dielectric layer 12*b* and the layer 16 may be formed of or include a same material.

In some embodiments, the antenna element 20 includes a patch 210 and a patch 220 (also referred to as "a driven patch") coupled to the patch 210. In some embodiments, the patch 210 is disposed on the surface 10*a* of the carrier 10. In some embodiments, the patch 220 is disposed on the layer 14 and covered or encapsulated by the layer 16. In some embodiments, the feed 21 and the feed 22 (not shown in the cross-section illustrated in FIG. 1B) penetrate the carrier 10 (e.g., the RDL 12 and the dielectric layer 12*d*) to electrically connect to the patch 220 of the antenna element 20. In some embodiments, the feed 21 and the feed 22 (not shown in the cross-section illustrated in FIG. 1B) electrically connect to the conductive layer 12*a*3 of the RDL 12.

In some embodiments, the antenna element 20A includes a patch 210A and a patch 220A (also referred to as "a driven patch") coupled to the patch 210A. In some embodiments, the patch 210A is disposed on the surface 10*a* of the carrier 10. In some embodiments, the patch 220A is disposed on the layer 14 and covered by the layer 16. In some embodiments, the feed 21A (not shown in the cross-section illustrated in FIG. 1B) and the feed 22A penetrate the carrier 10 (e.g., the RDL 12 and the dielectric layer 12*d*) to electrically connect to the patch 220A of the antenna element 20A. In some embodiments, the feed 21A (not shown in the cross-section illustrated in FIG. 1B) and the feed 22A electrically connect to the conductive layer 12*a*3 of the RDL 12.

In some embodiments, the conductive elements 41, 42, 43, 44, 41A, 42A, 43A, and 44A are disposed in the carrier 10 and configured to provide ground connection for the parasitic patches 31, 32, 33, 34, 31A, 32A, 33A, and 34A, respectively. In some embodiments, the conductive elements 41, 42, 43, 44, 41A, 42A, 43A, and 44A are disposed in the carrier 10 (e.g., the layers 14 and 16) and electrically connected to the parasitic patches 31, 32, 33, 34, 31A, 32A, 33A, and 34A, respectively. In some embodiments, the conductive elements 41, 42, 43, 44, 41A, 42A, 43A, and 44A penetrate the carrier 10 and contact bottom surfaces of the parasitic patches 31, 32, 33, 34, 31A, 32A, 33A, and 34A, respectively. In some embodiments, the conductive elements 41, 42, 43, 44, 41A, 42A, 43A, and 44A penetrate the carrier 10 and contact the conductive layer 12*a*4 of the RDL 12.

Please be noted that while FIG. 1B illustrates the cross-section along the line 1B-1B' in FIG. 1A, only the conductive elements 42, 44, 41A, and 43A and the parasitic patches 32, 34, 31A, and 33A are explicitly shown in FIG. 1B. However, the structural arrangements of the conductive elements 41, 43, 42A, and 44A and the parasitic patches 31, 33, 32A, and 34A may be derived from the above description in reference to FIG. 1B.

The electronic component 50 may be electrically connected to the antenna through the carrier 10. In some embodiments, the electronic component 50 is electrically connected to the RDL 12 through the connection elements 60. The electronic component 50 may be configured to control the antenna (e.g., the antenna elements 20 and 20A) of the electronic device 1. The electronic component 50 may control the antenna (e.g., the antenna elements 20 and 20A) through the RDL 12 and the feeds 21, 22, 21A, and 22A. The electronic component 50 may communicate with the antenna (e.g., the antenna elements 20 and 20A) through the conductive layers 12*a*1 and 12*a*3, the conductive via 12*v*2, and the feeds 21, 22, 21A, and 22A. The electronic component 50 may transmit a signal to the antenna. The electronic component 50 may receive a signal from the antenna. The electronic component 50 may transmit a signal to or receive a signal from one or more external components through the conductive layers 12*a*1 and 12*a*2 and the conductive via 12*v*1. In some embodiments, the electronic component 50 may be or include a processing component. In some embodiments, the electronic component 50 may include one or more of a controller, a processor, a logic die, a digital signal processor (DSP), an application-specific integrated circuit (ASIC), an input/output device, a radio frequency (RF) device, or other component(s) or semiconductor device(s).

The connection elements 60 may electrically connect the electronic component 50 to the carrier 10. The connection elements 60 may be or include solder balls, controlled collapse chip connection (C4) bumps, or the like.

The electrical contacts 70 may be disposed on the surface 10*b* of the carrier 10. In some embodiments, the electrical contacts 70 are configured to provide electrical connections between the electronic device 1 and external components (e.g., external circuits or circuit boards). The electrical connects 70 may be or include C4 bumps, a ball grid array (BGA), or a land grid array (LGA).

Figure 2A:
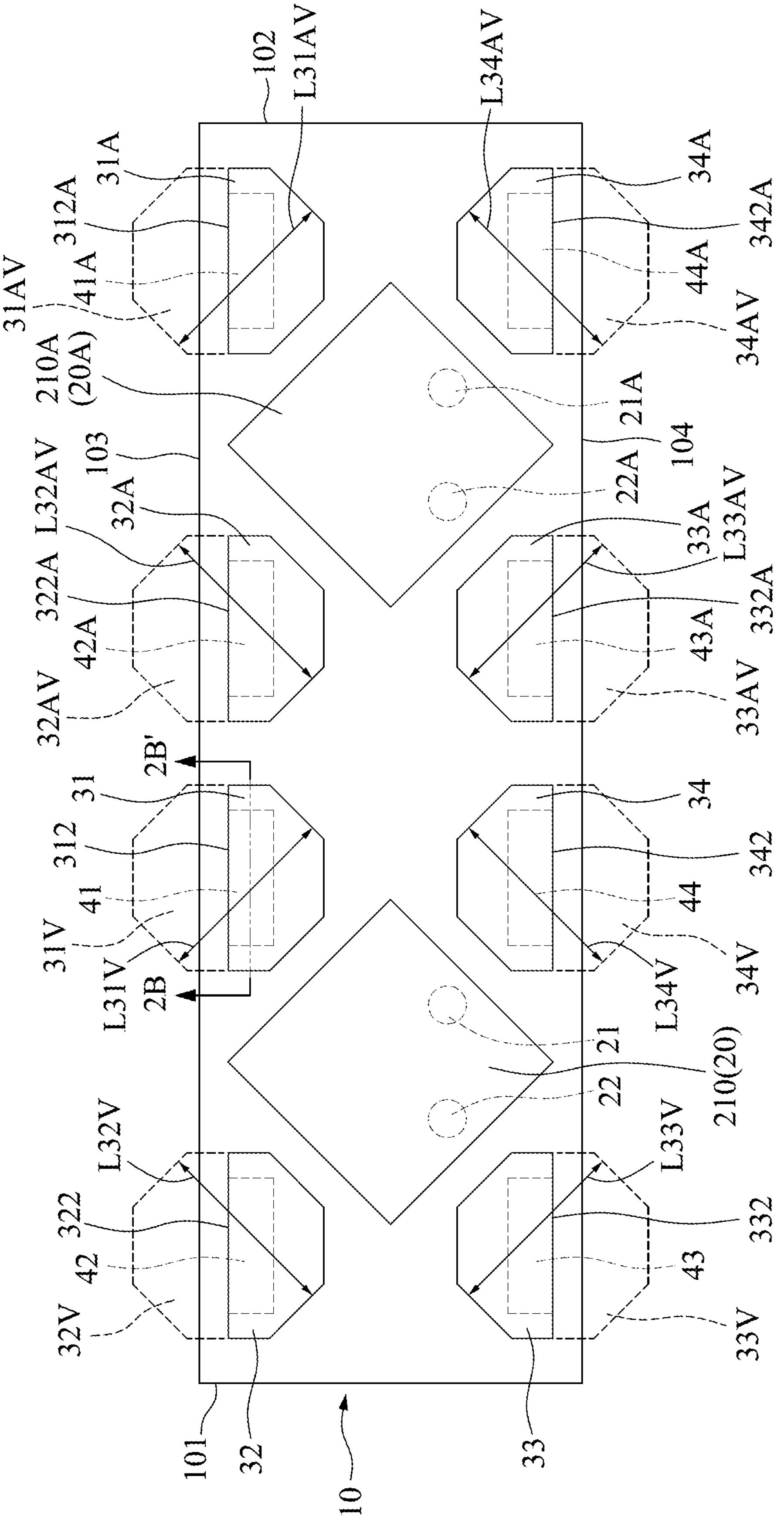
FIG. 2A is a top view of an electronic device in accordance with some embodiments of the present disclosure.

FIG. 2A is a top view of an electronic device 1 in accordance with some embodiments of the present disclosure. FIG. 2A shows the structure of the electronic device 1 illustrated in FIG. 1A with auxiliary dashed lines that represent the functions of the antenna of the electronic device 1.

While at least one parasitic patch (e.g., one or more of the parasitic patches 31, 32, 33, 34, 31A, 32A, 33A, and 34A) is shorted (i.e., connected to ground) at an edge (e.g., one or more of the edges 312, 322, 332, 342, 312A, 322A, 332A, and 342A) having a length substantially equal to $\lambda/2$; as a result, the current at the edge of the parasitic patch is not zero, and the grounded parasitic patch has a current-voltage distribution substantially the same as that of a $\lambda/2$ patch antenna. That is, the parasitic patch turns into having a current-voltage distribution similar to that of a planar inverted-F antenna (PIFA). Accordingly, the parasitic patch that is shorted (or grounded) at the edge may have a current-voltage distribution substantially the same as a parasitic patch that is not shorted (or grounded) at the edge and having a pattern that has substantially twice the area of the grounded parasitic patch, the edge of the grounded parasitic patch being a symmetric axis of the pattern.

In some embodiments, as shown in FIG. 2A, the grounded parasitic patch 31 may have a current-voltage distribution substantially the same as a parasitic patch having a pattern with the edge 312 as its symmetric axis and having an area including the parasitic patch 31 and the area 31V. In some embodiments, as shown in FIG. 2A, the grounded parasitic patch 32 may have a current-voltage distribution substantially the same as a parasitic patch having a pattern with the edge 322 as its symmetric axis and having an area including the parasitic patch 32 and the area 32V. In some embodiments, as shown in FIG. 2A, the grounded parasitic patch 33 may have a current-voltage distribution substantially the same as a parasitic patch having a pattern with the edge 332 as its symmetric axis and having an area including the parasitic patch 33 and the area 33V. In some embodiments, as shown in FIG. 2A, the grounded parasitic patch 34 may have a current-voltage distribution substantially the same as a parasitic patch having a pattern with the edge 342 as its symmetric axis and having an area including the parasitic patch 34 and the area 34V. In some embodiments, as shown in FIG. 2A, the grounded parasitic patch 31A may have a current-voltage distribution substantially the same as a parasitic patch having a pattern with the edge 312A as its symmetric axis and having an area including the parasitic patch 31A and the area 31AV. In some embodiments, as shown in FIG. 2A, the grounded parasitic patch 32A may have a current-voltage distribution substantially the same as a parasitic patch having a pattern with the edge 322A as its symmetric axis and having an area including the parasitic patch 32A and the area 32AV. In some embodiments, as shown in FIG. 2A, the grounded parasitic patch 33A may have a current-voltage distribution substantially the same as a parasitic patch having a pattern with the edge 332A as its symmetric axis and having an area including the parasitic patch 33A and the area 33AV. In some embodiments, as shown in FIG. 2A, the grounded parasitic patch 34A may have a current-voltage distribution substantially the same as a parasitic patch having a pattern with the edge 342A as its symmetric axis and having an area including the parasitic patch 34A and the area 34AV.

In some embodiments, the conductive element 41 may be referred to as a current distribution unit configured to form an equivalent patch area (e.g., a combination of the area of the parasitic patch 31 and the area 31V) of the parasitic patch 31. In some embodiments, the equivalent patch area has a length L31V extending in a direction substantially parallel to the direction DR1 of electric current of the antenna element 20 and substantially equal to λ/2. In some embodiments, the conductive element 42 may be referred to as a current distribution unit configured to form an equivalent patch area (e.g., a combination of the area of the parasitic patch 33 and the area 33V) of the parasitic patch 32. In some embodiments, the equivalent patch area has a length L32V extending in a direction substantially parallel to the direction DR2 of electric current of the antenna element 20 and substantially equal to λ/2. In some embodiments, the conductive element 43 may be referred to as a current distribution unit configured to form an equivalent patch area (e.g., a combination of the area of the parasitic patch 33 and the area 33V) of the parasitic patch 33. In some embodiments, the equivalent patch area has a length L33V extending in a direction substantially parallel to the direction DR1 of electric current of the antenna element 20 and substantially equal to λ/2. In some embodiments, the conductive element 44 may be referred to as a current distribution unit configured to form an equivalent patch area (e.g., a combination of the area of the parasitic patch 34 and the area 34V) of the parasitic patch 34. In some embodiments, the equivalent patch area has a length L34V extending in a direction substantially parallel to the direction DR2 of electric current of the antenna element 20 and substantially equal to λ/2.

In some embodiments, the conductive element 41A may be referred to as a current distribution unit configured to form an equivalent patch area (e.g., a combination of the area of the parasitic patch 31A and the area 31AV) of the parasitic patch 31A. In some embodiments, the equivalent patch area has a length L31AV extending in a direction substantially parallel to the direction DR1A of electric current of the antenna element 20A and substantially equal to λ/2. In some embodiments, the conductive element 42A may be referred to as a current distribution unit configured to form an equivalent patch area (e.g., a combination of the area of the parasitic patch 33A and the area 33AV) of the parasitic patch 32A. In some embodiments, the equivalent patch area has a length L32AV extending in a direction substantially parallel to the direction DR2A of electric current of the antenna element 20A and substantially equal to λ/2. In some embodiments, the conductive element 43A may be referred to as a current distribution unit configured to form an equivalent patch area (e.g., a combination of the area of the parasitic patch 33A and the area 33AV) of the parasitic patch 33A. In some embodiments, the equivalent patch area has a length L33AV extending in a direction substantially parallel to the direction DR1A of electric current of the antenna element 20A and substantially equal to λ/2. In some embodiments, the conductive element 44A may be referred to as a current distribution unit configured to form an equivalent patch area (e.g., a combination of the area of the parasitic patch 34A and the area 34AV) of the parasitic patch 34A. In some embodiments, the equivalent patch area has a length L34AV extending in a direction substantially parallel to the direction DR2A of electric current of the antenna element 20A and substantially equal to λ/2.

In some embodiments, the equivalent patch area of the parasitic patch 31 is substantially equal to twice an area of the parasitic patch 31. In some embodiments, the equivalent patch area of the parasitic patch 32 is substantially equal to twice an area of the parasitic patch 32. In some embodiments, the equivalent patch area of the parasitic patch 33 is substantially equal to twice an area of the parasitic patch 33. In some embodiments, the equivalent patch area of the parasitic patch 34 is substantially equal to twice an area of the parasitic patch 34. In some embodiments, the equivalent patch area of the parasitic patch 31A is substantially equal to twice an area of the parasitic patch 31A. In some embodiments, the equivalent patch area of the parasitic patch 32A is substantially equal to twice an area of the parasitic patch 32A. In some embodiments, the equivalent patch area of the parasitic patch 33A is substantially equal to twice an area of the parasitic patch 33A. In some embodiments, the equivalent patch area of the parasitic patch 34A is substantially equal to twice an area of the parasitic patch 34A.

Please be noted that the areas 31V, 32V, 33V, 34V, 31AV, 32AV, 33AV, and 34AV are defined by auxiliary dashed lines and only used to illustrate equivalent antenna patches, and these areas are not real structures or patches. As shown in FIG. 2A, while the areas 31V, 32V, 31AV, and 32AV exceed the side 103 of the carrier 10, and the areas 33V, 34V, 33AV, and 34AV exceed the side 104 of the carrier 10, the grounded parasitic patches 31, 32, 33, 34, 31A, 32A, 33A, and 34A are disposed within the sides 103 and 104 and can be provided with substantially the same performance (e.g., the current-voltage distribution) with a reduced total area.

Presented below are simulation results of an exemplary antenna E1 and comparative exemplary antennas C1 and C2. The exemplary antenna E1 has a structure including the antenna elements 20 and 20A, the parasitic patches 31, 32, 33, 34, 31A, 32A, 33A, and 34A, and the conductive elements 41, 42, 43, 44, 41A, 42A, 43A, and 44A shown in FIGS. 1A-1B. The comparative exemplary antenna C1 has a structure including the antenna elements 20 and 20A and parasitic patches having a pattern including portions defined by areas of the parasitic patches 31, 32, 33, 34, 31A, 32A, 33A, and 34A and areas 31V, 32V, 33V, 34V, 31AV, 32AV, 33AV, and 34AV shown in FIG. 2A, and the parasitic patches having the aforesaid pattern are not grounded. The comparative exemplary antenna C2 has a structure including the antenna elements 20 and 20A and the parasitic patches 31, 32, 33, 34, 31A, 32A, 33A, and 34A shown in FIG. 2A, and the parasitic patches 31, 32, 33, 34, 31A, 32A, 33A, and 34A are not grounded. In Table 1, "Isolation" indicates the isolation between ports (i.e., feeds having orthogonal linear polarizations) of the antenna elements 20 and 20A, and "BW" indicates the bandwidth of the antenna.

TABLE 1

| | BW (GHz) | Isolation (dB) | Gain at 27 GHz (dBi) | Gain at 30 GHz (dBi) | Area of patches ($mm^2$) |
|---|---|---|---|---|---|
| C1 | 3.92 | 16.4 | 7.01 | 5.75 | 5.33*5.86 |
| C2 | 3.7 | 10.09 | 6.51 | 5.6 | Reduced by 34% |
| E1 | 3.98 | 16.95 | 6.24 | 5.14 | Reduced by 34% |

From Table 1, the simulation results of the comparative exemplary antenna C2 show that when the area of the parasitic patches is reduced, the isolation is relatively poor if the parasitic patches are not grounded. In contrast, with the parasitic patches being grounded in accordance with some embodiments of the present disclosure, the exemplary antenna E1 has a relatively large bandwidth which is comparable to that of the comparative exemplary antenna C1 having a relatively large antenna area, and the isolation of the exemplary antenna E1 is also satisfactory. Therefore, in accordance with some embodiments of the present disclosure, the exemplary antenna E1 has a relatively large bandwidth, a relatively high isolation, and a significantly reduced antenna area.

According to some embodiments of the present disclosure, with the designs of one or more grounded parasitic patches coupled to an antenna element (or a stacked patch), the area of the patches of the antenna can be significantly reduced while achieving substantially the same performance (e.g., the current-voltage distribution, the relatively large bandwidth, the relatively high isolation, and etc.) of the antenna of the electronic device. For example, as described above, the total area of the parasitic patches can be reduced by about 50%, and the total area of the antenna can be reduced by about 34%.

Figure 2B:
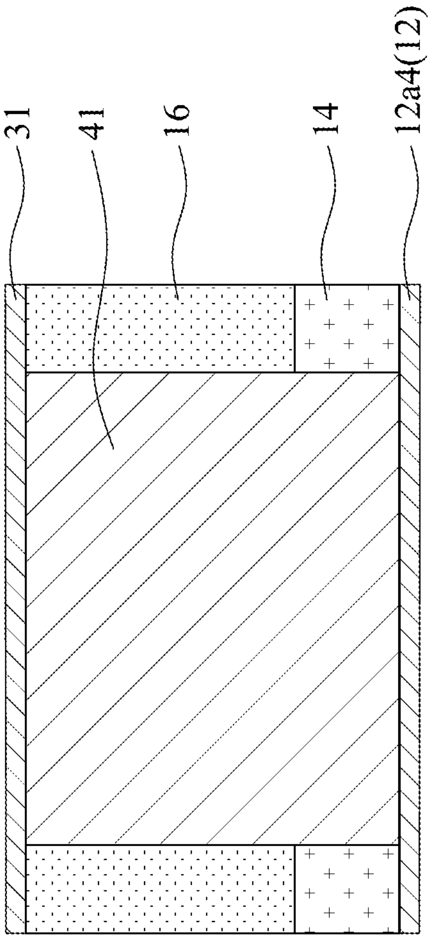
FIG. 2B is a cross-section of a portion of an electronic device in accordance with some embodiments of the present disclosure.

FIG. 2B is a cross-section of a portion of an electronic device in accordance with some embodiments of the present disclosure. In some embodiments, FIG. 2B is a cross-section along a line 2B-2B' in FIG. 2A.

In some embodiments, as shown in FIG. 2B, the conductive element 41 is or includes a conductive bulk material penetrating the layers 14 and 16. In some embodiments, the conductive element 41 is or includes a conductive block, a conductive pillar, or the like. In some embodiments, the conductive elements 42, 43, 44, 41A, 42A, 43A, and 44A may be independently formed of or include a conductive bulk material. In some embodiments, the conductive elements 42, 43, 44, 41A, 42A, 43A, and 44A may be independently formed of or include a conductive block, a conductive pillar, or the like.

Figure 2C:
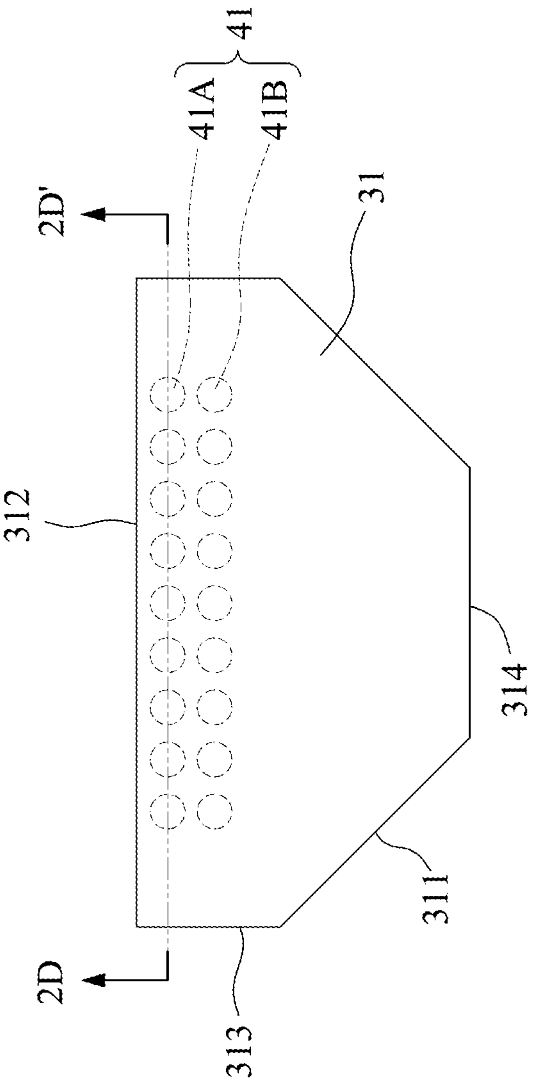
FIG. 2C is a top view of a portion of an electronic device in accordance with some embodiments of the present disclosure.

FIG. 2C is a top view of a portion of an electronic device in accordance with some embodiments of the present disclosure. In some embodiments, the electronic device 1 illustrated in FIGS. 1A-1B may include the parasitic patch 31 and the conductive element 41 shown in FIG. 2C.

In some embodiments, the conductive element 41 includes a plurality of conductive portions 41A and 41B. In some embodiments, the conductive portions 41A and 41B include conductive pillars, conductive vias, or the like. The conductive portions 41A and the conductive portions 41B are arranged in two rows. In some embodiments, the rows of the conductive portions 41A and 41B extend along the edge 312 that has a maximum length among the edges of the parasitic patch 31. In some embodiments, the rows of the conductive portions 41A and 41B extend along the edge 312 that has a length substantially equal to $\lambda/2$.

Figure 2D:
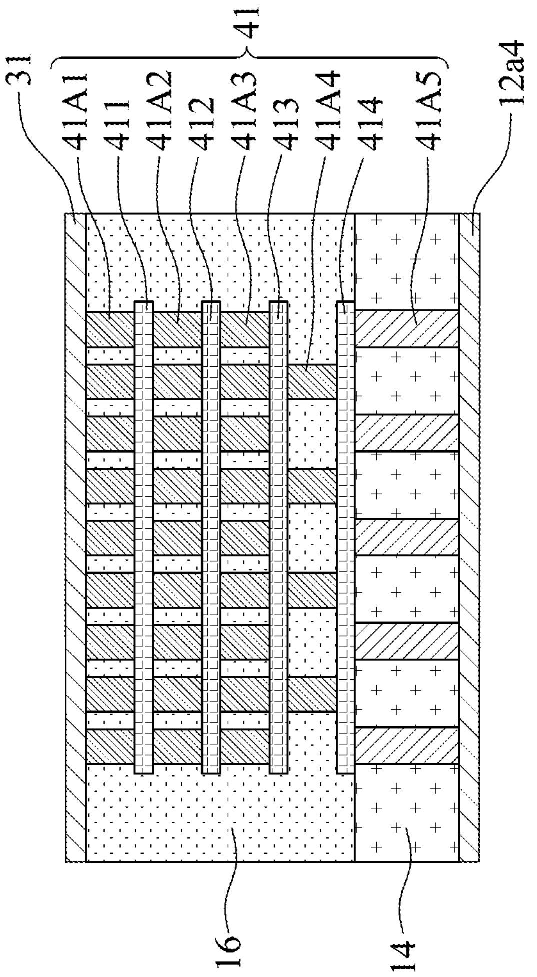
FIG. 2D is a cross-section of a portion of an electronic device in accordance with some embodiments of the present disclosure.

FIG. 2D is a cross-section of a portion of an electronic device in accordance with some embodiments of the present disclosure. In some embodiments, FIG. 2D is a cross-section along a line 2D-2D' in FIG. 2C.

In some embodiments, the conductive element 41 includes a plurality of conductive vias. In some embodiments, the conductive element 41 includes stacked conductive vias 41A1, 41A2, 41A3, 41A4 and 41A5 and conductive layers 411, 412, 413, and 414 electrically connecting the stacked conductive vias 41A1, 41A2, 41A3, 41A4 and 41A5. In some embodiments, the conductive portions 41A shown in FIG. 2C may represent the arrangements of the conductive vias 41A1.

Please be noted that while FIG. 2D illustrates the cross-section along the line 2D-2D' in FIG. 2C, only the row of the conductive portions 41A including the conductive vias 41A1, 41A2, 41A3, 41A4 and 41A5 is explicitly shown in FIG. 2D. However, the structural arrangements of the conductive vias of the row of the conductive portions 41B may be derived from the above description in reference to FIG. 2C. In some embodiments, the conductive element 41 further includes stacked conductive vias along the row of the conductive portions 41B and having a same arrangement as that of the conductive vias 41A1, 41A2, 41A3, 41A4 and 41A5, and the conductive layers 411, 412, 413, and 414 electrically connect the stacked conductive vias along the row of the conductive portions 41B.

Figure 2E:
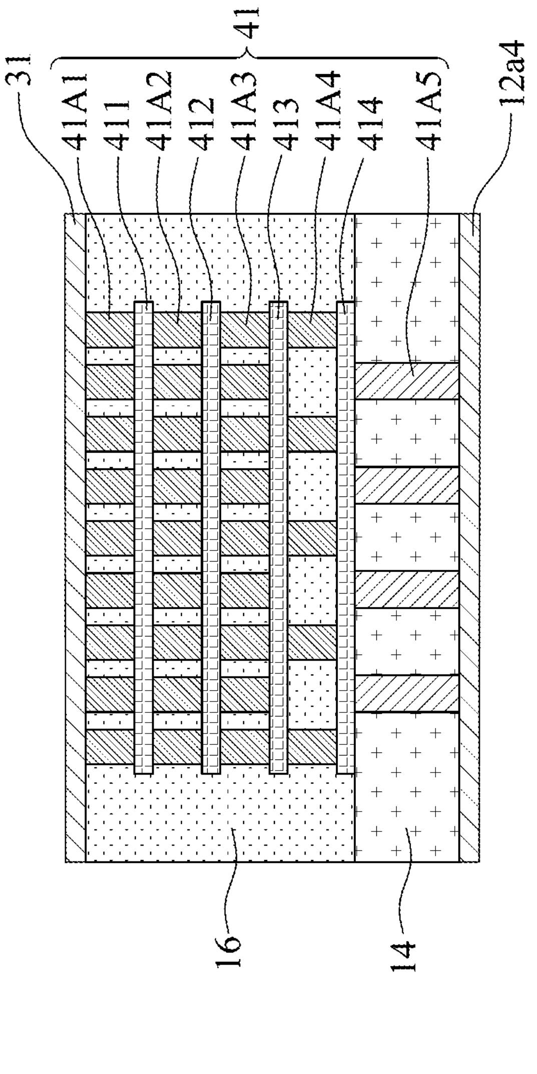
FIG. 2E is a cross-section of a portion of an electronic device in accordance with some embodiments of the present disclosure.

FIG. 2E is a cross-section of a portion of an electronic device in accordance with some embodiments of the present disclosure. In some embodiments, FIG. 2E is a cross-section along a line 2D-2D' in FIG. 2C.

In some embodiments, the structure illustrated in FIG. 2E is similar to that illustrated in FIG. 2D, and the differences are the number and arrangements of the conductive vias 41A4 and 41A5.

Presented below are simulation results of an exemplary antennas E2-E4. The exemplary antenna E2 has a structure including the antenna element 20, the parasitic patches 31, 32, 33, and 34, and the conductive elements 41, 42, 43, and 44 shown in the left portion of FIG. 2A and in FIG. 2B. The exemplary antenna E3 has a structure including the antenna element 20, the parasitic patches 31, 32, 33, and 34, and the conductive elements 41, 42, 43, and 44 shown in FIGS. 2C and 2D. The exemplary antenna E4 has a structure including the antenna element 20, the parasitic patches 31, 32, 33, and 34, and the conductive elements 41, 42, 43, and 44 shown in FIGS. 2C and 2E.

TABLE 2

| | BW (GHz) | Isolation (dB) | Gain at 27 GHz (dBi) | Gain at 30 GHz (dBi) |
|---|---|---|---|---|
| E2 | 4.41 | 15.7 | 5.97 | 4.36 |
| E3 | 4.65 | 14.93 | 5.6 | 4.02 |
| E4 | 4.67 | 14.74 | 5.5 | 3.9 |

From Table 2, the simulation results of the exemplary antennas E2-E4 show that they all have relatively large bandwidths and relatively high isolation with reduced antenna areas resulted from the design of the grounded parasitic patches. In addition, the exemplary antennas E3 and E4 show relatively large bandwidth and relatively high isolation which are comparable to that of the exemplary antenna E2, and it shows that the conductive element including conductive vias can provide performance that is comparable to the conductive element being a conductive bulk material. The conductive element formed of conductive vias is advantageous to simplify the manufacturing process and increase the yield. For example, the formation of the conductive vias of the conductive element can be integrated into or manufactured by an existing build-up process for forming a laminated carrier or substrate.

Figure 3A:
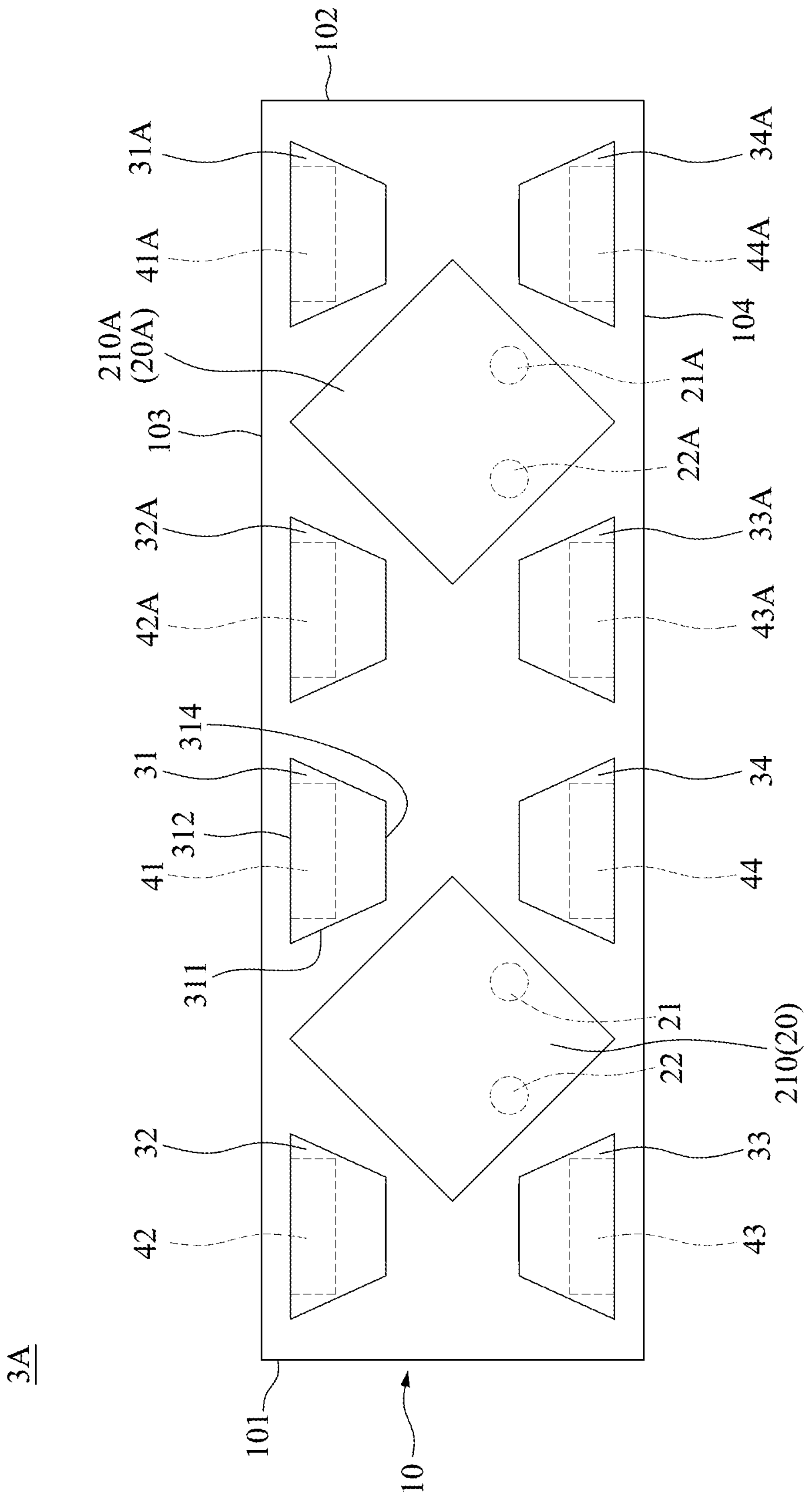
FIG. 3A is a top view of an electronic device in accordance with some embodiments of the present disclosure.
Figure 3B:
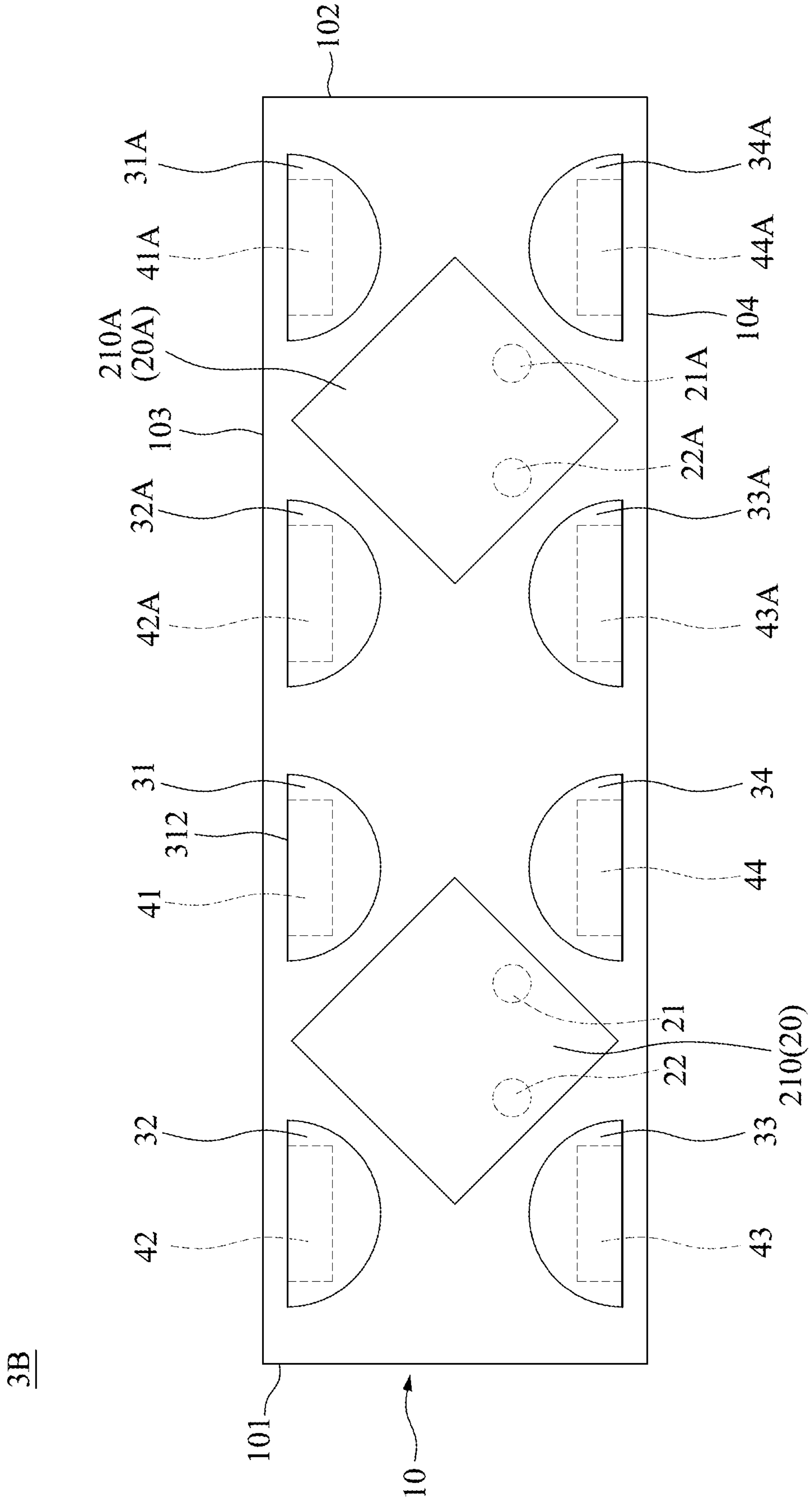
FIG. 3B is a top view of an electronic device in accordance with some embodiments of the present disclosure.
Figure 3C:
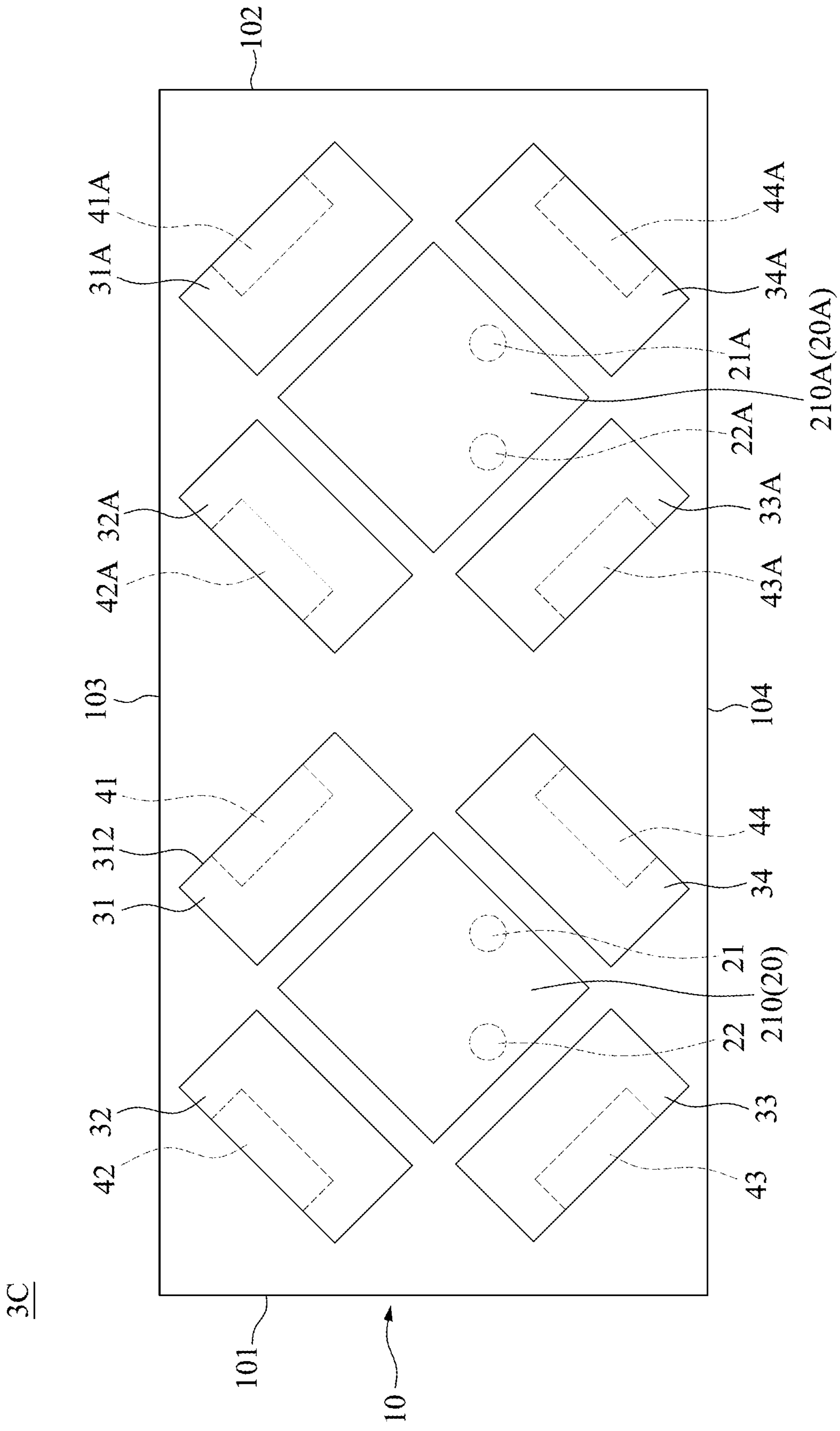
FIG. 3C is a top view of an electronic device in accordance with some embodiments of the present disclosure.

FIG. 3A is a top view of an electronic device 3A in accordance with some embodiments of the present disclosure. FIG. 3B is a top view of an electronic device 3B in accordance with some embodiments of the present disclosure. FIG. 3C is a top view of an electronic device 3C in accordance with some embodiments of the present disclosure. In some embodiments, the electronic devices 3A, 3B, and 3C are similar to the electronic device 1 in FIG. 1A, except that, for example, the parasitic patches 31, 32, 33, 34, 31A, 32A, 33A, and 34A have different shapes. In some embodiments, as shown in FIG. 3A, each of the parasitic patches 31, 32, 33, 34, 31A, 32A, 33A, and 34A has a half-hexagonal shape. In some embodiments, as shown in FIG. 3B, each of the parasitic patches 31, 32, 33, 34, 31A, 32A, 33A, and 34A has a semi-circular shape. In some embodiments, as shown in FIG. 3C, each of the parasitic patches 31, 32, 33, 34, 31A, 32A, 33A, and 34A has a half-square shape (or a rectangular shape).

Figure 3D:
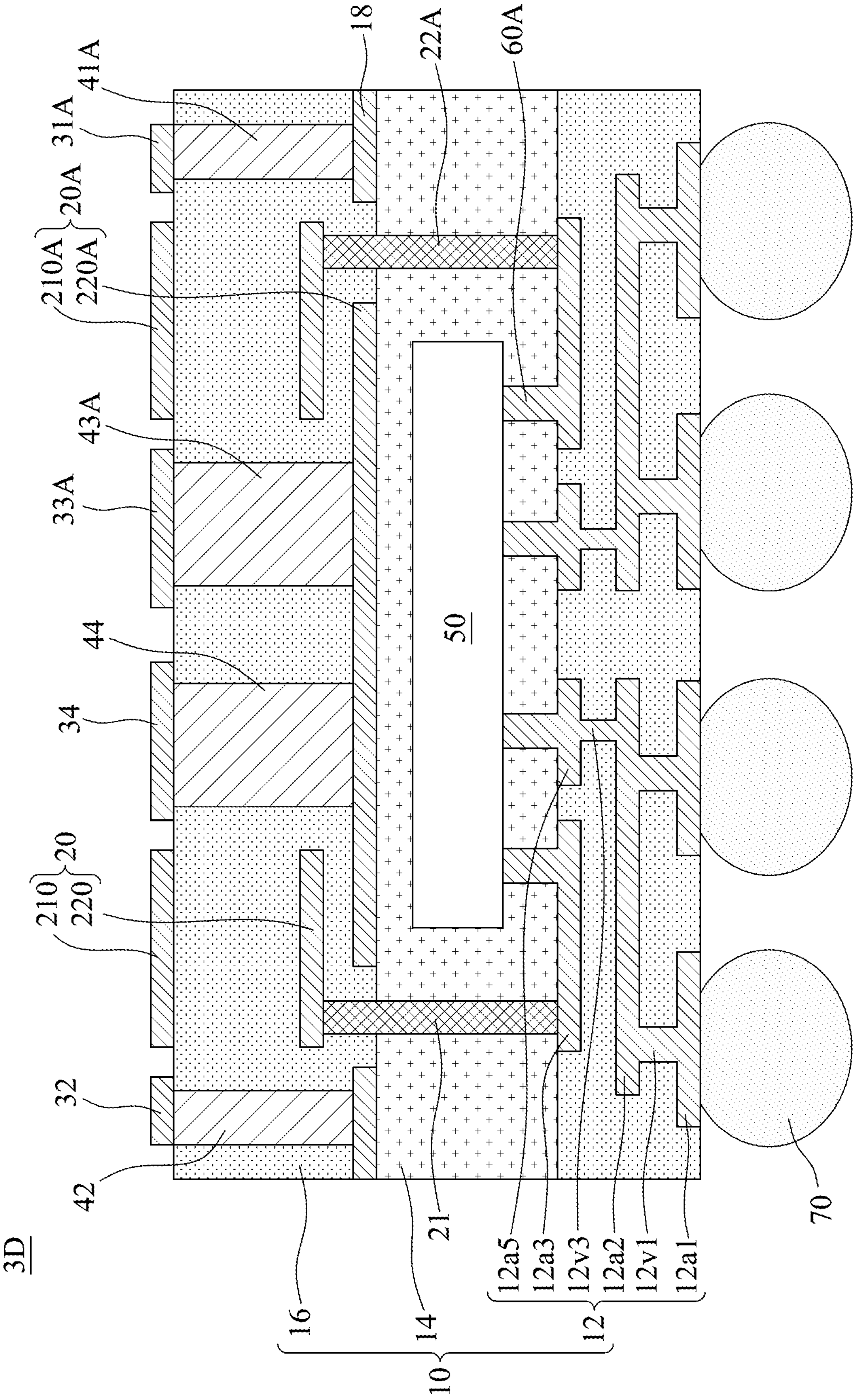
FIG. 3D is a cross-section of an electronic device in accordance with some embodiments of the present disclosure.

FIG. 3D is a cross-section of an electronic device 3D in accordance with some embodiments of the present disclosure. In some embodiments, FIG. 3D is a cross-section along the line 1B-1B' in FIG. 1A. The electronic device 3D is similar to the electronic device 1 in FIG. 1B, with differences therebetween as follows.

In some embodiments, the electronic device 3D includes a conductive layer 18 on the layer 14 and covered or encapsulated by the layer 16. In some embodiments, the conductive layer 18 is or includes a ground element. In some embodiments, the conductive layer 18 is a ground plane or connected to ground. In some embodiments, the conductive elements 41, 42, 43, 44, 41A, 42A, 43A, and 44A penetrate the carrier 10 (e.g., the layer 16) and contact the conductive layer 18 to connect to ground. Please be noted that while FIG. 3D illustrates the cross-section along a cross-sectional line, only the conductive elements 42, 44, 41A, and 43A and the parasitic patches 32, 34, 31A, and 33A are explicitly shown in FIG. 3D. However, the structural arrangements of the conductive elements 41, 43, 42A, and 44A and the parasitic patches 31, 33, 32A, and 34A may be derived from the above description in reference to FIG. 3D.

In some embodiments, the electronic component 50 is embedded in the layer 14. In some embodiments, the electronic component 50 is electrically connected to the conductive layer **12*a*5 of the RDL 12 through connection elements 60A. The electronic component 50 may control the antenna (e.g., the antenna elements 20 and 20A) through the RDL 12 and the feeds 21, 22, 21A, and 22A. The electronic component 50 may communicate with the antenna (e.g., the antenna elements 20 and 20A) through the conductive layer 12*a*3, the connection elements 60A, and the feeds 21, 22, 21A, and 22A. The electronic component 50 may transmit a signal to the antenna. The electronic component 50 may receive a signal from the antenna. The electronic component 50 may transmit a signal to or receive a signal from one or more external components through the conductive layers 12*a*1, 12*a*2, and 12*a*5 and the conductive via 12*v*1 and 12*v*3**.

Figure 4A:
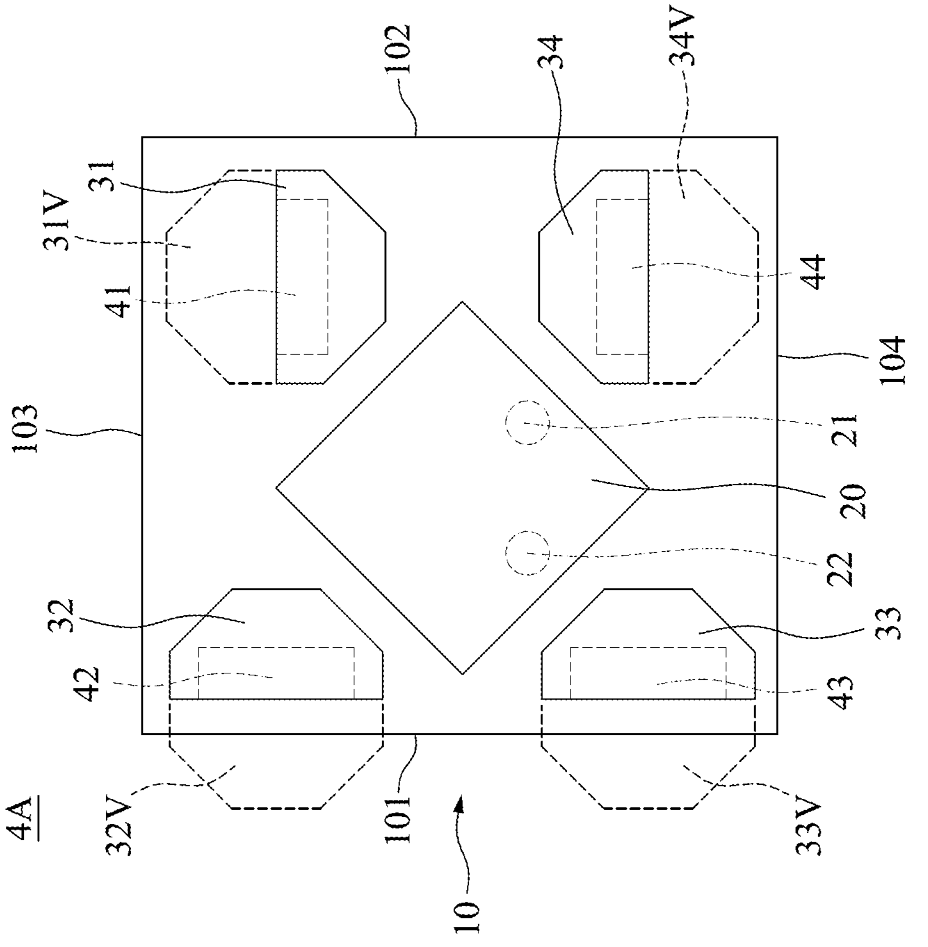
FIG. 4A is a top view of an electronic device in accordance with some embodiments of the present disclosure.

FIG. 4A is a top view of an electronic device 4A in accordance with some embodiments of the present disclosure. In some embodiments, the electronic device 4A is similar to the electronic device 1 in FIG. 1A, and the differences are the arrangements of the parasitic patches 32 and 33 and the conductive elements 42 and 43. In some embodiments, the parasitic patch 31 and the parasitic patch 34 are mirror-image symmetric, and the parasitic patch 32 and the parasitic patch 33 are mirror-image symmetric. In some embodiments, the parasitic patch 31 and the parasitic patch 32 collectively form an asymmetric shape, and the parasitic patch 33 and the parasitic patch 34 collectively form an asymmetric shape. As shown in FIG. 4A, the arrangements of the grounded parasitic patches in accordance with some embodiments of the present disclosure may be adjusted according to actual application, the areas 32V and 33V still exceed the side 101 of the carrier 10, and thus the total area of the patches are still reduced compared to the situation where the parasitic patches are not grounded.

Figure 4B:
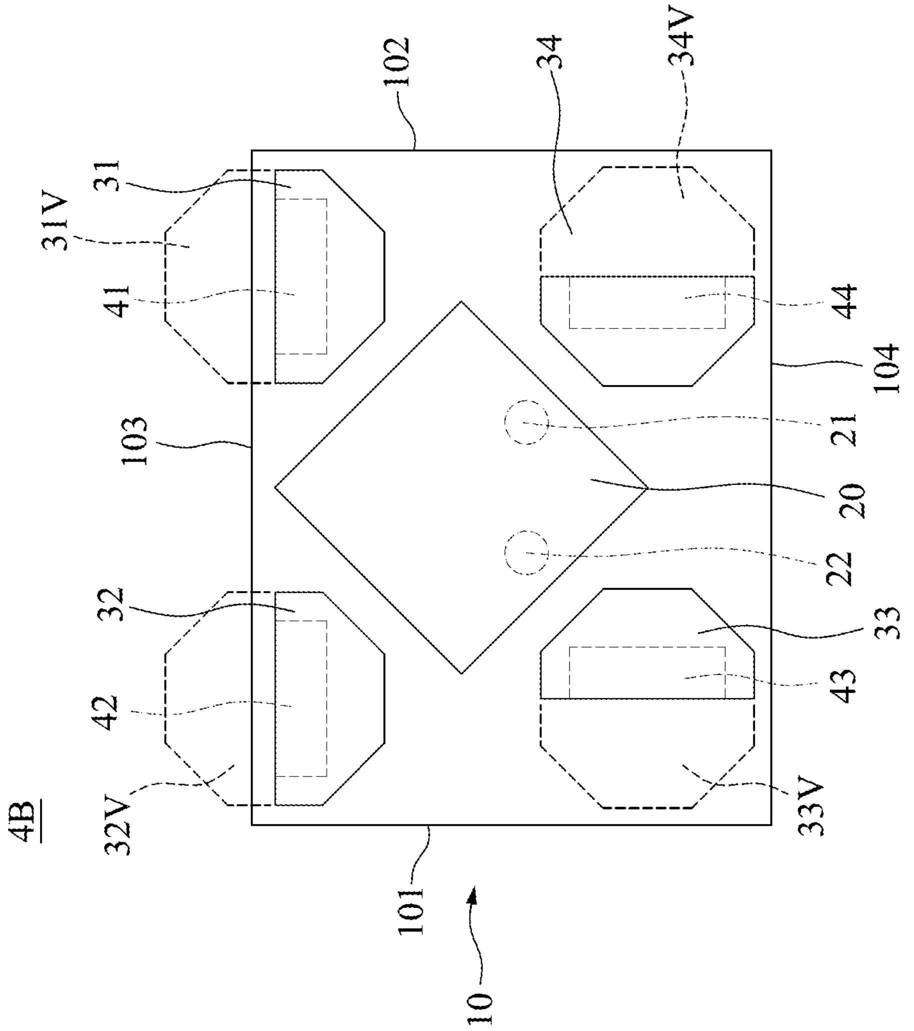
FIG. 4B is a top view of an electronic device in accordance with some embodiments of the present disclosure.
Figure 4C:
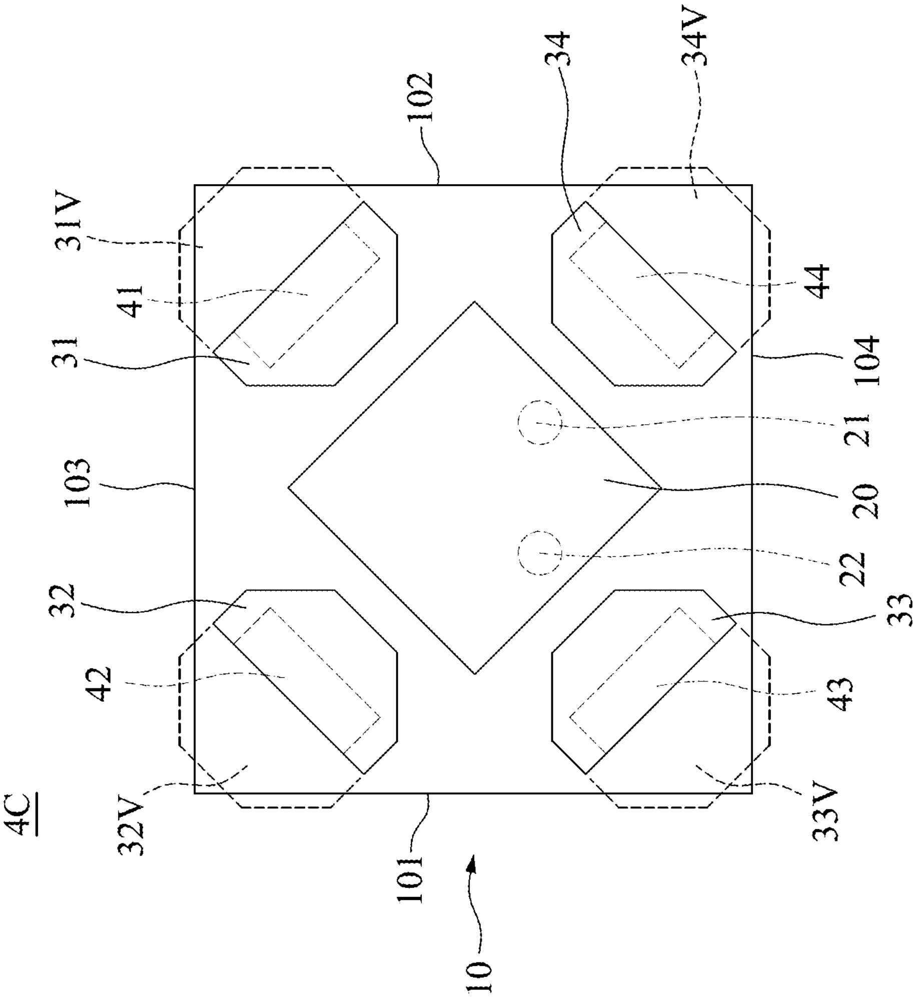
FIG. 4C is a top view of an electronic device in accordance with some embodiments of the present disclosure.
Figure 4D:
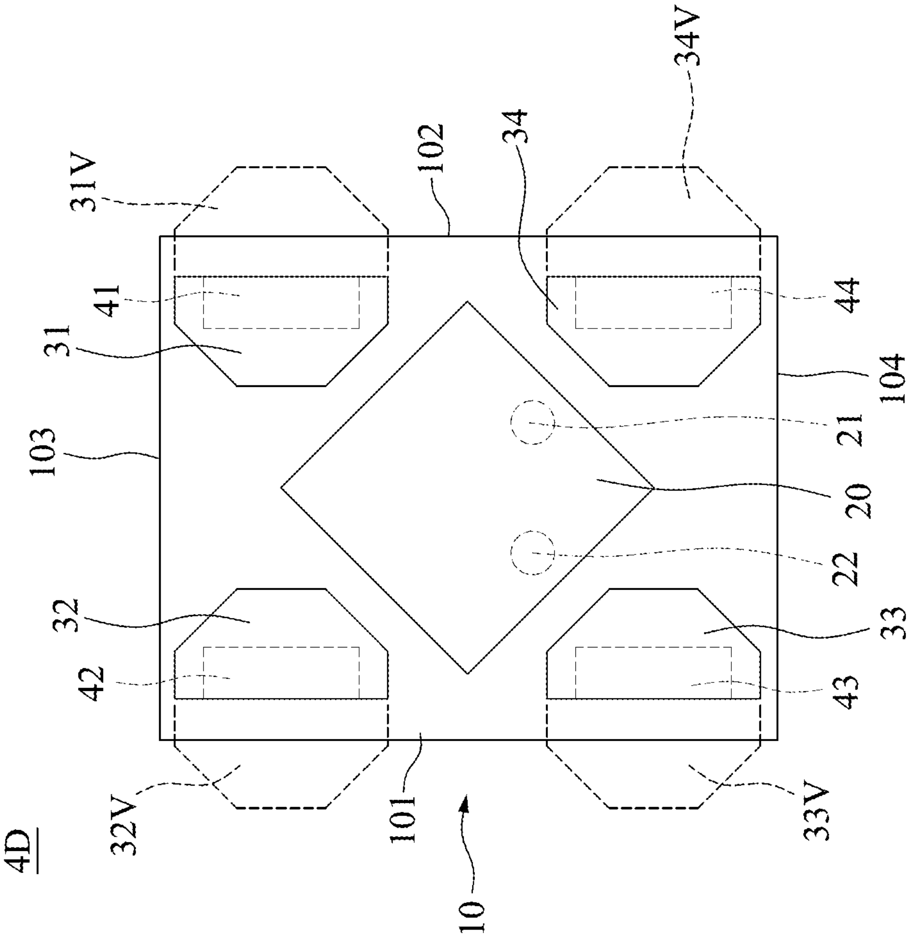
FIG. 4D is a top view of an electronic device in accordance with some embodiments of the present disclosure.

FIG. 4B is a top view of an electronic device 4B in accordance with some embodiments of the present disclosure. FIG. 4C is a top view of an electronic device in accordance with some embodiments of the present disclosure. FIG. 4D is a top view of an electronic device in accordance with some embodiments of the present disclosure. In some embodiments, the electronic devices 4B-4D are similar to the electronic device 1 in FIG. 1A and/or the electronic device 4A in FIG. 4A, and the differences are at least the arrangements of the parasitic patches.

As shown in FIGS. 4B-4D, the arrangements of the grounded parasitic patches in accordance with some embodiments of the present disclosure may be adjusted according to actual application, at least some of the areas 31V, 32V, 33V, and 34V still exceed one or more of the sides 101-104 of the carrier 10, and thus the total area of the patches are still reduced compared to the situation where the parasitic patches are not grounded.

According to some embodiments of the present disclosure, the shape of the parasitic patches may have various designs according to the desired application, e.g., desired electrically coupling. In some embodiments, each of the parasitic patches has a semi-circular shape (as shown in FIG. 3B), the area of the parasitic patches within a coupling region of the main patch (e.g., the patch 210) is relatively large compared to those having a half-hexagonal shape or a half-octagonal shape, thus the coupling can be increased, and the gain of the antenna is relatively high. In some embodiments, each of the parasitic patches 31, 32, 33, 34, 31A, 32A, 33A, and 34A may have a half regular polygonal shape having n sides, and n is an even number. By arranging the parasitic patches with predetermined polygonal shapes adjacent to the antenna element, despite that other conductive patterns, wiring layers, or other elements/features may be disposed or formed over the carrier and adjacent to the antenna so as to occupy certain device area, the parasitic patches with predetermined polygonal shapes can be arranged or fit in the available area, and thus the overall area (in x-y plane or in a horizontal plane) of the electronic device may be miniaturized. In addition, the arrangements of the parasitic patches with predetermined polygonal shapes may vary to reduce the patch area to a predetermined area and/or shape of the electronic device (as shown in FIGS. 4A-4D). Therefore, the design flexibility is increased.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of said numerical value, such as less than or equal to ±5%, less than or equal to ±4%, less than or equal to ±3%, less than or equal to ±2%, less than or equal to #1%, less than or equal to ±0.5%, less than or equal to ±0.1%, or less than or equal to ±0.05%. For example, two numerical values can be deemed to be "substantially" or "about" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately 104 S/m, such as at least 105 S/m or at least 106 S/m. The electrical conductivity of a material can sometimes vary with temperature. Unless otherwise specified, the electrical conductivity of a material is measured at room temperature.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

While the present disclosure has been described and illustrated with reference to specific embodiments thereof, these descriptions and illustrations do not limit the present disclosure. It can be clearly understood by those skilled in the art that various changes may be made, and equivalent components may be substituted within the embodiments without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and the like. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. An electronic device, comprising:

a carrier;

an antenna element at least partially over the carrier;

a first parasitic patch adjacent to the antenna element; and a first current distribution unit configured to form a first equivalent patch area of the first parasitic patch, wherein the first equivalent patch area has a first length extending in a direction substantially parallel to a first direction of electric current of the antenna element and substantially equal to λ/2, λ being a wavelength of an operating frequency of the antenna element.

2. The electronic device as claimed in claim 1, wherein the first equivalent patch area is substantially equal to twice an area of the first parasitic patch.

3. The electronic device as claimed in claim 1, wherein the antenna element is configured to couple with the first parasitic patch to resonate at a first frequency.

4. The electronic device as claimed in claim 3, further comprising:

a second parasitic patch adjacent to the antenna element; and a second current distribution unit configured to form a second equivalent patch area of the second parasitic patch, wherein the second equivalent patch area has a second length extending in the direction substantially parallel to the first direction of electric current of the antenna element and substantially equal to λ/2, and the antenna element is configured to couple with the second parasitic patch to resonate at a second frequency different from the first frequency.

5. The electronic device as claimed in claim 4, wherein the first frequency and the second frequency are configured to determine a bandwidth of the antenna element.

6. The electronic device as claimed in claim 4, wherein the antenna element has a first side and a second side opposite to the first side, the first parasitic patch is disposed at the first side, and the second parasitic patch is disposed at the second side.

7. The electronic device as claimed in claim 1, wherein the first current distribution unit is configured to provide a ground connection for the first parasitic patch.

8. The electronic device as claimed in claim 7, wherein a length of the first current distribution unit is substantially equal to or less than λ/2 from a top view perspective.

9. The electronic device as claimed in claim 7, wherein the carrier has a first side, and a long side of the first current distribution unit extends in a direction substantially parallel to the first side of the carrier from a top view perspective.

10. The electronic device as claimed in claim 9, further comprising:

a third parasitic patch adjacent to the antenna element; and a third current distribution unit configured to provide a ground connection for the third parasitic patch, wherein a long side of the third current distribution unit extends in the direction substantially parallel to the first side of the carrier from the top view perspective.

11. The electronic device as claimed in claim 10, wherein the first parasitic patch and the third parasitic patch form a symmetric shape.

12. The electronic device as claimed in claim 1, wherein the first parasitic patch has a half regular polygonal shape having n sides, and n is an even number.

13. The electronic device as claimed in claim 1, wherein the first parasitic patch has a semi-circular shape.

14. The electronic device as claimed in claim 1, wherein the antenna element comprises a first feed and a second feed, a first electrical current flows through the first feed in the first direction of electric current, and a second electrical current flows through the second feed in a second direction of electric current that is substantially perpendicular to the first direction of electrical current.

15. An electronic device, comprising:

a carrier; and an antenna, comprising:

a first patch disposed over the carrier;

a parasitic patch adjacent to the first patch and configured to electrically couple with the first patch to increase a bandwidth of the antenna; and a conductive element configured to provide a ground connection for the parasitic patch;

wherein the conductive element is configured to form an equivalent patch area of the parasitic patch, the equivalent patch area has a length extending in a direction substantially parallel to a linear polarization direction of the first patch, and the length is substantially equal to $\lambda/2$, $\lambda$ being a wavelength of an operating frequency of the antenna.

16. The electronic device as claimed in claim 15, wherein the parasitic patch has an asymmetric shape from a top view perspective.

17. The electronic device as claimed in claim 15, wherein the parasitic patch has a plurality of edges from a top view perspective, the edges comprise a first edge having a maximum length among the edges, and the conductive element is disposed closer to the first edge of the parasitic patch than to the other edges of the parasitic patch.

18. The electronic device as claimed in claim 17, wherein the conductive element comprises a plurality of conductive vias arranged in a plurality of rows that extend along the first edge of the parasitic patch.

19. The electronic device as claimed in claim 15, wherein the antenna further comprises a second patch under the first patch and configured to electrically couple with the first patch.

* * * * *